(12) United States Patent
Jang et al.

(10) Patent No.: US 12,395,233 B2
(45) Date of Patent: Aug. 19, 2025

(54) METHOD AND SYSTEM FOR IN-BUILDING RADIO UNIT APPLIED TO OPEN LAN WITH FREQUENCY RESOURCE DISTRIBUTION

(71) Applicant: TJ INNOVATION CO., LTD., Bucheon-si (KR)

(72) Inventors: Gwang-Jae Jang, Bucheon-si (KR); Yu Jin Lim, Bucheon-si (KR); Sung Hoon Yoon, Bucheon-si (KR); Duck Young Park, Bucheon-si (KR); Jin Sil Park, Bucheon-si (KR)

(73) Assignee: TJ INNOVATION CO., LTD., Bucheon (KR)

( * ) Notice: Subject to any disclaimer, the term of this patent is extended or adjusted under 35 U.S.C. 154(b) by 0 days.

(21) Appl. No.: 17/910,416

(22) PCT Filed: Mar. 2, 2022

(86) PCT No.: PCT/KR2022/002900
§ 371 (c)(1),
(2) Date: Sep. 9, 2022

(87) PCT Pub. No.: WO2023/163259
PCT Pub. Date: Aug. 31, 2023

(65) Prior Publication Data
US 2024/0214055 A1    Jun. 27, 2024

(30) Foreign Application Priority Data
Feb. 28, 2022    (KR) .................... 10-2022-0025897

(51) Int. Cl.
*H04B 7/155*    (2006.01)
*H04B 7/0413*    (2017.01)
*H04B 7/06*    (2006.01)

(52) U.S. Cl.
CPC ....... *H04B 7/15528* (2013.01); *H04B 7/0413* (2013.01); *H04B 7/0617* (2013.01); *H04B 7/0626* (2013.01)

(58) Field of Classification Search
CPC .............. H04B 7/15528; H04B 7/0413; H04B 7/0617; H04B 7/0626; H04B 7/0456;
(Continued)

(56) References Cited

U.S. PATENT DOCUMENTS

2009/0046582 A1* 2/2009 Sarkar et al. .............. 370/230.1
2009/0061939 A1* 3/2009 Andersson et al. ....... 455/562.1
(Continued)

FOREIGN PATENT DOCUMENTS

KR          102238213         4/2021
KR       1020210054377       5/2021
(Continued)

OTHER PUBLICATIONS (WO 2013001884 A1) >>> Information Communication Terminal, Agent Program, Position Estimation System and Position Estimation Method (see title) (Year: 2013).*

(Continued)

*Primary Examiner* — Marisol Figueroa

(57) ABSTRACT

Disclosed herein is an in-building radio unit applied to an open LAN having an open base station structure. The in-building radio unit is configured to match a beam ID and a front-end unit based on beamforming information received from a base station; and communicatively connect a terminal and the base station via the matched front-end unit, the terminal and the base station being connected to the matched front-end unit.

13 Claims, 6 Drawing Sheets

(58) Field of Classification Search
CPC ........ H04B 7/0408; H04B 7/06; H04B 7/155; H04B 7/0695; H04B 7/088; H04B 10/114; H04B 10/1149; H04W 36/08; H04W 16/00; H04W 16/20; H04W 16/22; H04W 16/225; H04W 16/28; H04W 16/14; H04W 88/00; H04W 88/02; H04W 88/04; H04W 88/06; H04W 88/08; H04W 88/16; H04W 88/18; H04W 92/06; H04W 92/00; H04W 92/02; H04W 92/08; H04W 92/10; H04W 4/33; H04W 4/02; H04W 8/08; H04W 4/38; H04W 4/50; H04W 4/029; H04W 4/021; H04W 4/30; H04L 5/00; H04L 5/005
See application file for complete search history.

(56) References Cited

U.S. PATENT DOCUMENTS

| | | | | |
|---|---|---|---|---|
| 2013/0244697 | A1* | 9/2013 | Kusakari et al. | ....... H04W 4/04 |
| 2017/0325260 | A1* | 11/2017 | Guo et al. | ........... H04W 74/006 |
| 2018/0351618 | A1* | 12/2018 | Ho et al. | .............. H04B 7/0608 |
| 2020/0322017 | A1* | 10/2020 | Lee et al. | ............. H04B 7/0617 |
| 2021/0385781 | A1* | 12/2021 | Chen et al. | ......... H04W 64/003 |
| 2022/0155404 | A1* | 5/2022 | Kumar et al. | ........ G01S 5/0236 |
| 2022/0159637 | A1* | 5/2022 | Kundu et al. | |
| 2022/0294518 | A1* | 9/2022 | Hsieh et al. | ........... H04B 7/088 |

FOREIGN PATENT DOCUMENTS

| | | |
|---|---|---|
| WO | WO 0122754 A1 * | 3/2001 |
| WO | 2021/003283 | 1/2021 |
| WO | 2021/112747 | 6/2021 |
| WO | 2021/167763 | 8/2021 |

OTHER PUBLICATIONS (JP 2014530534 A) >>> Method And Apparatus For Forming Virtual Cell In Wireless Communication System (see title) (Year: 2014).*
(WO 2017142358 A1) >>> Method and Device for Performing Communication in Wireless Communication System (see title) (Year: 2017).*
(WO 2018173646 A1) >>> (2) Next, means for matching the recognition of the beam ID between the mobile terminal and the base station will be described. (see description) (Year: 2018).*
Office Action for Korean Patent Application No. 2022-0025897, Date of Mailing: Jul. 20, 2023.
Mustafa Mohsin et al., "On Analyzing Beamforming Implementation in O-RAN 5G," Electronics 10, No. 17: 2162, (Sep. 4, 2021).
Andrew Kolomatski, "5G NR Typical Beamforming Cases," https://www.linkedin.com/pulse/5g-nr-typical-beamforming-cases-andrew-kolomatski, (Jan. 27, 2021).
Office Action for Korean Patent Application No. 10-2022-0025897, Date of Mailing, Jul. 20, 2023.
Office Action for Japan Patent Application No. 10-2022-0025897, Date of Mailing: Jan. 29, 2024.

* cited by examiner

[FIGURE 1]
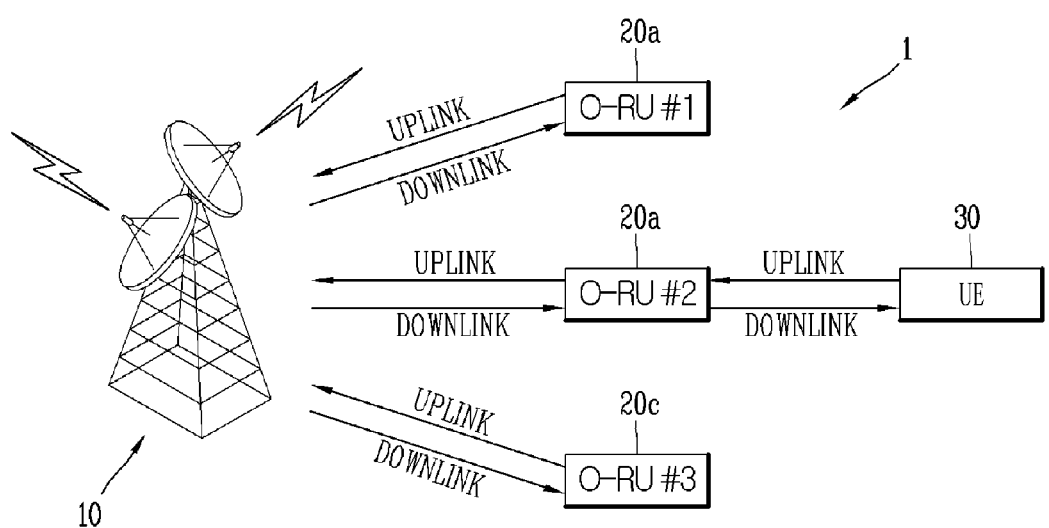

【FIGURE 2】
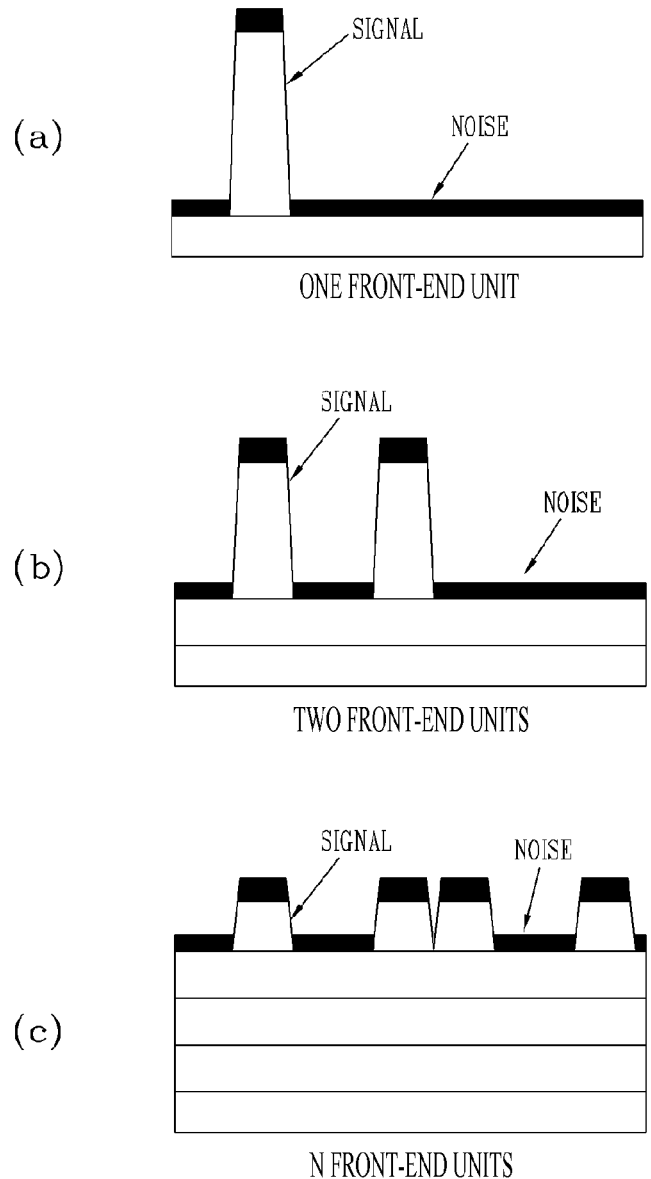

【FIGURE 3】
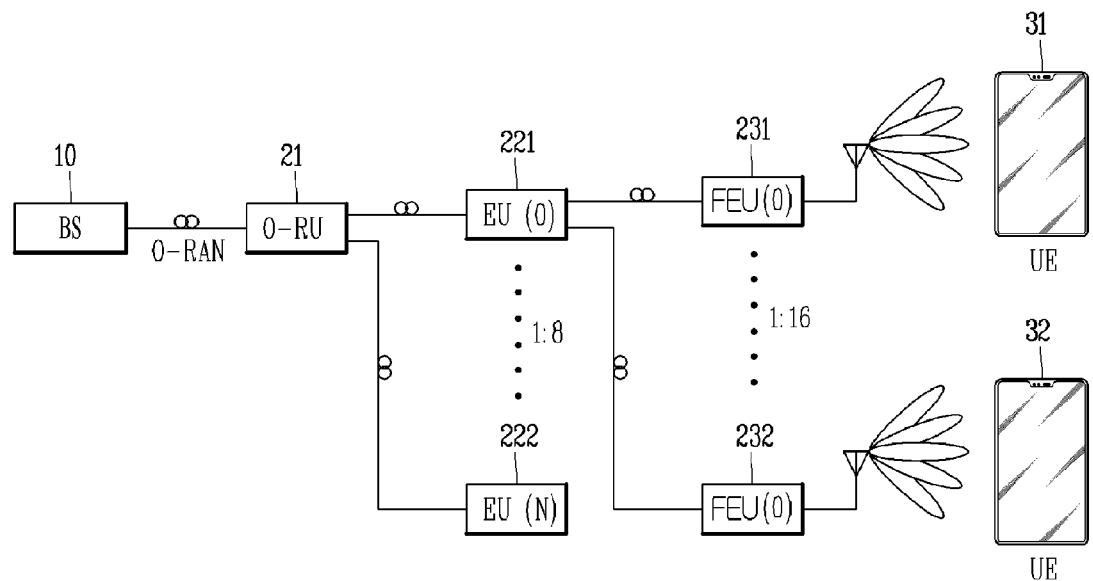
【FIGURE 4A】
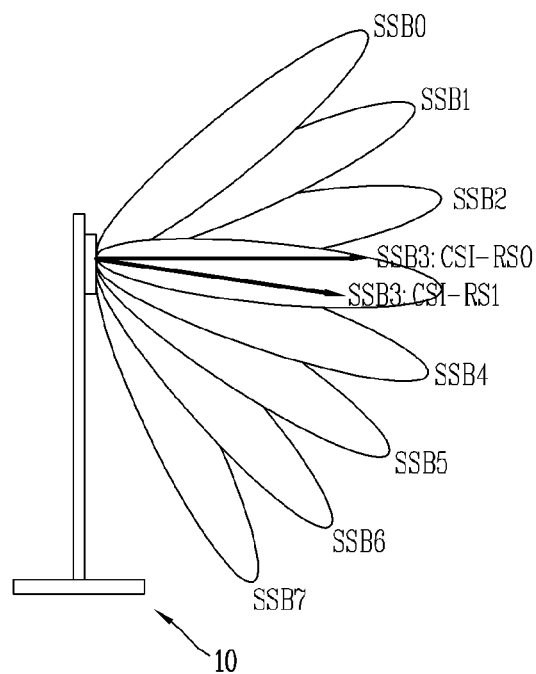

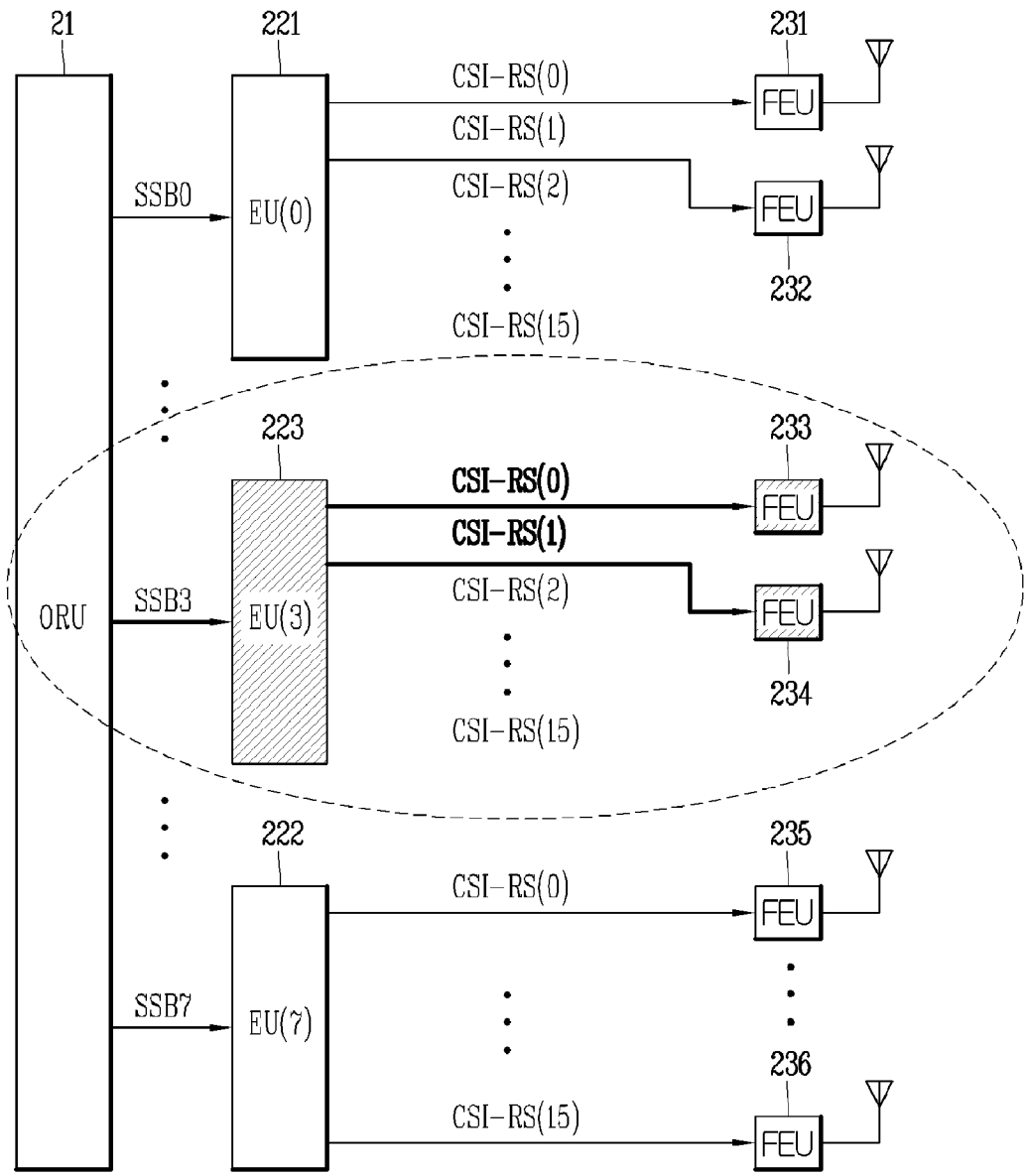
【FIGURE 4B】

【FIGURE 5】
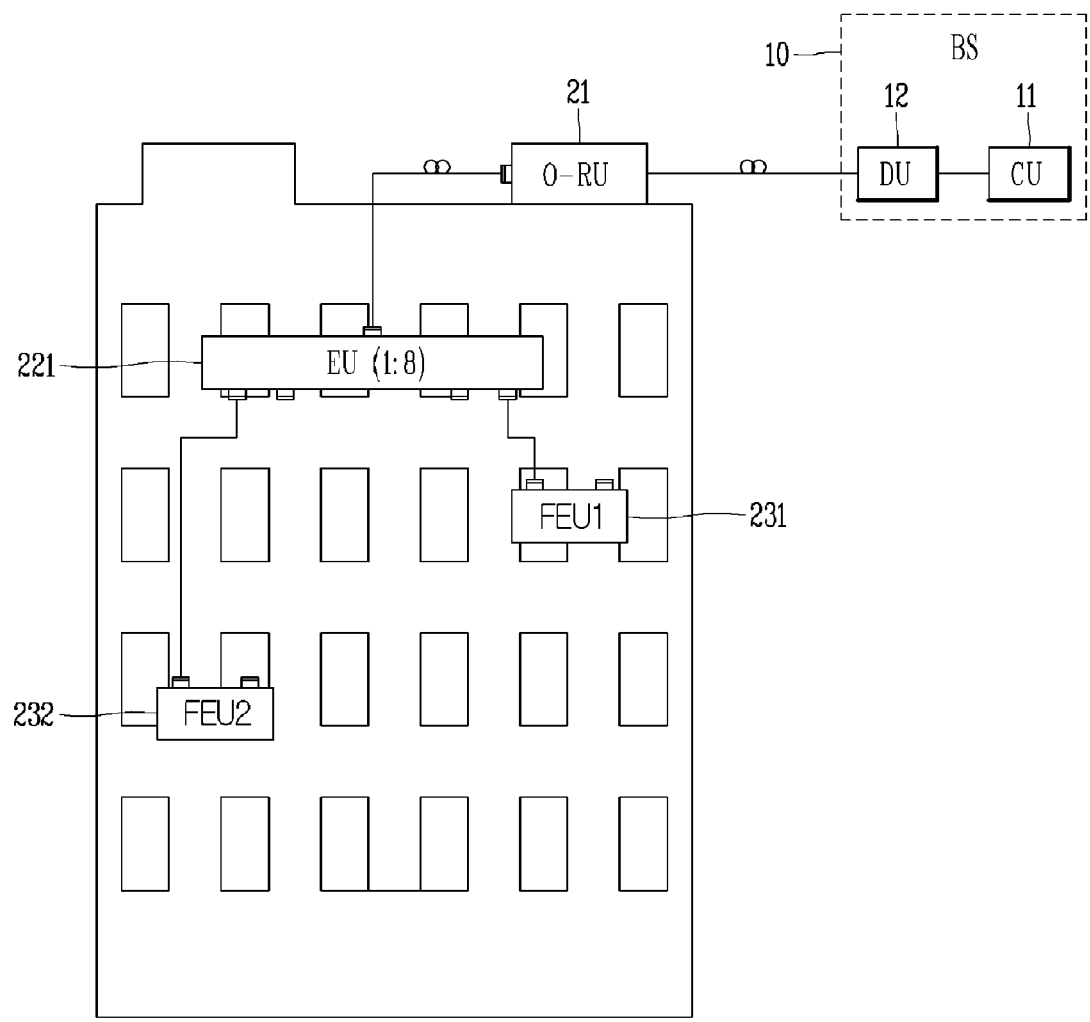

【FIGURE 6】
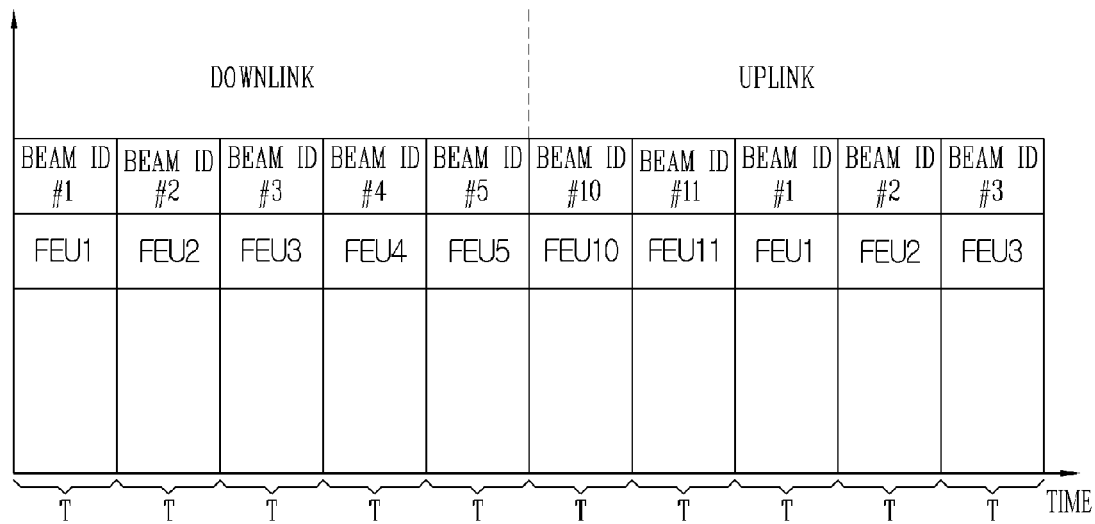
【FIGURE 7】
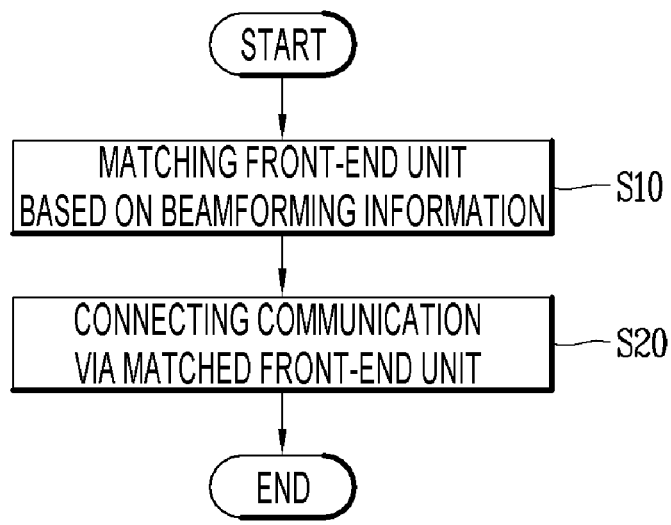

METHOD AND SYSTEM FOR IN-BUILDING RADIO UNIT APPLIED TO OPEN LAN WITH FREQUENCY RESOURCE DISTRIBUTION

TECHNICAL FIELD

The present disclosure provides an in-building service using a radio unit (O-RU) satisfying an open wireless network access protocol standard, and more particularly, an in-building beamforming effect such as efficient distribution of wireless resources and improvement of uplink coverage by replacing an antenna-oriented direction with signal path switching between the in-building O-RU and a front-end unit in an outdoor beamforming operation.

BACKGROUND ART

Recently, in order to achieve a high data transfer rate, implementation of a 5G communication system in an ultra-high frequency (mmWave) band, for example, a 60 GHz band, has been discussed. In order to reduce the path loss of radio waves in the ultra-high frequency band and increase the transmission distance of radio waves, beamforming, massive MIMO, full-dimensional MIMO (FD-MIMO), array antenna, analog beamforming, and large scale antenna technologies have been discussed in relation to 5G communication systems.

Among such technologies, beamforming, which is a technology for concentrating a radio signal in a specific direction by changing the amplitude and phase of the signal supplied to multiple antennas at both a user terminal and a base station, may enable efficient and smooth data transmission/reception and enhance the coverage without increasing the number of base stations in high-frequency wireless communications.

The Open Radio Access Network (O-RAN), established by operators and equipment providers for a system that combines a 4G communication system and a 5G communication system, defines new network element (NE) and interface standards based on the existing 3GPP standards and presents an O-RAN structure.

FIG. 1 is a block diagram of a system according to an embodiment of the present disclosure.

As illustrated in FIG. 1, a system 1 according to an embodiment of the present disclosure may include a base station 10, a terminal 30 communicatively connected to the base station 12 via in-building radio units 20a to 20c, and the in-building radio unit 20a to 20c configured to transmit an uplink signal to the base station 12.

In the in-building service, the in-building radio units 20a to 20c generally have sufficient capacities, but their coverage is small. This is because radio waves cannot be transmitted efficiently due to obstacles such as walls, glass, and inter-floor isolation in the building.

In expansion of coverage, it is more economical to distribute antennas than to add more in-building radio units 20a to 20c because the wave propagation distance decreases as the frequency increase. However, backward noise increases in proportion to the number of antennas in the uplink, that is, the backward direction.

In addition, since the uplink has weak signal strength due to the limited power of the terminal 30, the weak backward signal is interfered with by noise, and thus the backward coverage is further narrowed. Further, the backward signal-to-interference noise ratio (SINR) is deteriorated due to the backward noise, and thus the throughput is reduced.

For example, when there is one front-end unit (FEU) for the in-building radio units 20a to 20c, a communication signal containing noise is configured as illustrated in FIG. 2(a). When there are two FEUs, a communication signal containing noise is configured as illustrated in FIG. 2(b). When there are n FEUs, a communication signal containing noise is configured as illustrated in FIG. 2(c).

That is, as the number of FEUs increases, the noise index NF increases. Because the in-building radio units 20a to 20c are not noiseless devices, the noise index NF may increase as the number of the units increases.

Therefore, when multiple FEUs are required to be connected to the base station 10, a technology for addressing the issue of uplink noise that may occur is required. This issue may be addressed by applying the beamforming technology to the in-building radio units 20a to 20c.

DISCLOSURE

Technical Problem

Therefore, the present disclosure has been made in view of the above problems, and it is one object of the present disclosure to provide an in-building radio unit (or in-building O-RU) that is applied to an open LAN having an open base station structure and is capable of removing uplink noise accumulated with increase in the number of FEUs, a system including the same, and a control method for the same.

Technical Solution

In accordance with one aspect of the present disclosure, provided is an in-building radio unit applied to an open LAN having an open base station structure, the in-building radio unit being configured to match a beam ID and a front-end unit based on beamforming information received from a base station; and communicatively connect a terminal and the base station via the matched front-end unit, the terminal and the base station being connected to the matched front-end unit.

According to an embodiment, the in-building radio unit may support a fronthaul interface with the base station, the front-end unit being positioned between the in-building radio unit and the terminal to relay a communication signal, wherein the terminal may be wirelessly communicatively connected to the front-end unit rather than the radio unit.

According to an embodiment, the in-building radio unit may be for in-building use and is communicatively connected to the base station by wire, wherein the in-building radio unit may distribute communication paths between the base station and the front-end unit based on the beamforming information.

According to an embodiment, an extension unit configured to transmit a signal may be further provided between the radio unit and the front-end unit.

According to an embodiment, the in-building radio unit may match the extension unit and the front-end unit based on an SSB index and a CSI-RS index acquired from SSB information extracted by pre-coding the beamforming information.

According to an embodiment, the in-building radio unit may skip transmission of an unmatched signal of the front-end unit except for a matched signal of the front-end unit according to the beamforming information.

According to an embodiment, the beamforming information may be configured according to a generation period of C-plane data of the fronthaul interface.

According to an embodiment, the in-building radio unit may pre-code only the C-plane data of the fronthaul interface.

In accordance with another aspect of the present disclosure, provided is a distributed antenna system including the in-building radio unit; and a base station and a terminal communicatively connected via the in-building radio unit.

In accordance with another aspect of the present disclosure, provided is a method for controlling an in-building radio unit applied to an open LAN having an open base station structure, the method including matching, by the in-building radio unit, a beam ID and a front-end unit based on beamforming information received from a base station; and communicatively connecting a terminal and the base station via the matched front-end unit, the terminal and the base station being connected to the matched front-end unit.

According to an embodiment, the in-building radio unit may support a fronthaul interface with the base station, the front-end unit being positioned between the in-building radio unit and the terminal to relay a communication signal, wherein an extension unit may be positioned between the in-building radio unit and the front-end unit to transmit the signal, wherein the matching may include acquiring, by the in-building radio unit, an SSB index and a CSI-RS index from SSB information extracted by pre-coding the beamforming information; matching, by the in-building radio unit, the extension unit based on the SSB index; and matching, by the in-building radio unit, the front-end unit connected to the extension unit based on the CSI-RS index.

Advantageous Effects

According to the present disclosure, as the number of front-end units increases in an in-building radio unit (or in-building O-RU) applied to an open LAN having an open base station structure, accumulative uplink noise may be removed.

BRIEF DESCRIPTION OF DRAWINGS

FIG. 1 is a block diagram of a system according to an embodiment of the present disclosure.

FIG. 2 is a diagram schematically illustrating noise in an uplink signal with respect to a base station.

FIG. 3 is a block diagram of a system according to an embodiment of the present disclosure.

FIG. 4A is a diagram illustrating a beamforming technique according to an embodiment of the present disclosure.

FIG. 4B is a diagram illustrating beamforming information and FEUs that match each other according to an embodiment of the present disclosure.

FIG. 5 is a diagram illustrating a connection relationship between an in-building O-RU and a FEU according to an embodiment of the present disclosure.

FIG. 6 is a diagram illustrating an example of matching between beam IDs and FEUs according to an embodiment of the present disclosure.

FIG. 7 is a step-by-step flowchart of a method for controlling an in-building O-RU according to an embodiment of the present disclosure.

DETAILED DESCRIPTION OF INVENTION

Hereinafter, the present disclosure will be described in detail by explaining exemplary embodiments of the present disclosure with reference to the attached drawings. The same reference numerals in the drawings denote like elements, and a redundant description thereof will be skipped. As used herein, the suffixes "unit" and "part" are added or used interchangeably to facilitate preparation of this specification and are not intended to suggest distinct meanings or functions. In the following description of the embodiments of the present disclosure, a detailed description of known technology will be omitted to avoid obscuring the subject matter of the present disclosure. The accompanying drawings are intended to facilitate understanding of the embodiments disclosed herein, and should not be construed as including all modifications, equivalents and substitutes included within the spirit and scope of the present disclosure.

It will be understood that, although the terms "first," "second," "third," etc. may be used herein to describe various elements, the elements should not be limited by these terms.

These terms are only used to distinguish one element from another element.

It will be understood that when an element is referred to as being "on", "connected to" or "coupled to" another element, it may be directly on, connected or coupled to the other element, or intervening elements may be present. In contrast, when an element is referred to as being "directly on," "directly connected to" or "directly coupled to" another element or layer, there are no intervening elements present.

A singular expression includes a plural expression unless the context clearly dictates otherwise.

In this specification, the term "include" or "have" is intended to indicate that characteristics, figures, steps, operations, constituents, and components disclosed in the specification or combinations thereof exist. The term "include" or "have" should be understood as not precluding possibility of existence or addition of one or more other characteristics, figures, steps, operations, constituents, components, or combinations thereof.

System

FIG. 3 is a block diagram of a system according to an embodiment of the present disclosure.

As shown in FIG. 3, an in-building O-RU 21 according to the embodiment of the present disclosure is positioned between a base station (BS) 10 and a user equipment (UE) 30 to transmit or relay a signal.

Here, as shown in FIG. 4A, the BS 10, wirelessly transmits and receives radio waves to and from the UE 30, and beamforming technology may be used to establish an independent path between the BS 10 and the UE 30.

In the 5G network using the high frequency of the mmWave band, beamforming technology is used to overcome the high path loss of a high frequency signal. Considering the narrow coverage of beams, a beam-alignment operation is required to in order for the BS 10 and the UE 30 to exchange data with each other. Specifically, in order to align a beam between the BS 10 and the UE 30, the BS 10 may transmit a signal of a synchronization signal block (SSB) by beamforming by sequentially turning the beam direction at intervals of a predetermined angle in one direction. The operation of transmitting or receiving a signal by turning the beam direction at intervals of a predetermined angle is referred to as beam-sweeping or beam-scanning. Here, the beam-sweeping may represent an action from the perspective of the BS 10, and the beam-scanning may represent the action from the perspective of the receiver.

For example, when the BS 10 can have n beam directions, the BS 10 may transmit a signal such as an SSB while sweeping directions to support among the n beam directions.

In this operation, at least one beam may be grouped. In this case, a signal such as the SSB may be transmitted for each beam group.

The SSB transmitted in the same direction may have a plurality of SSBs in one cell. When there is a plurality of SSBs, an SSB index may be used to distinguish among the SSBs. For example, when SSBs are transmitted from one BS 10 in 8 beam directions, 8 SSB indexes having different beam directions, for example, SSB0 to SSB7 may be transmitted.

In this case, when the UE 30 is powered on or intends to access a new cell, it may determine the time required for transmission of a downlink signal and a uplink signal with respect to the BS 10 at an exact time and a frequency parameter based on the SSB information, thereby establishing synchronization. In this regard, the UE 30 may acquire information such as a beam ID (identity) from the SSB information.

The in-building O-RU 21 according to an embodiment of the present disclosure may receive beamforming information from the BS 10, and match the beam ID with the FEUs 231 to 236 based on the received beamforming information.

Specifically, based on the beamforming information transmitted from the BS 10, the in-building O-RU 21 may match at least one of the beam ID extracted from the information and at least one of the plurality of FEUs 231 to 236, and relay a signal between the UE 30 and the BS 10 connected to the matched FEUs 231 to 236, thereby establishing a connection for communication.

Then, the in-building O-RU 21 may activate only the FEUs 231 to 236 matched by the in-building O-RU 21 and allow the same to communicate with the BS 10. Thereby, the issue of uplink noise with respect to the BS 10 (see FIG. 2) that may be caused by simultaneous communication of several FEUs 231 to 236 may be addressed.

Specifically, the in-building O-RU 21 matches the beam ID extracted from the beamforming information transmitted from the BS 10 and the FEUs 231 to 236 to distribute the communication paths to the BS 10. Preferably, when matching the beam ID and the FEUs 231 to 236, the in-building O-RU 21 may temporally divide the plurality of FEUs 231 to 236 so as not to be matched simultaneously, and then match the beam ID with the FEUs 231 to 236 in a one-to-one correspondence manner according to a predetermined period.

FIG. 6 is a diagram illustrating an example of matching between beam IDs and FEUs according to an embodiment of the present disclosure.

For example, as shown in FIG. 6, the in-building O-RU 21 may match beam ID #1 with FEU #1 at T1, match beam ID #2 with FEU #2 at T2, and match beam ID #n with FEU #n at Tn, according to a predetermined period T.

The in-building O-RU 21 may time-divide an uplink section or a downlink section according to a predetermined period. The in-building O-RU 21 may not allow two or more FEUs 231 to 236 in different time-divided sections to be matched at the same time. In this case, preferably, each FEU 231 to 236 may open a communication path with the BS 10 via the O-RU 21 only when it is matched.

As shown in FIG. 3, the in-building O-RU 21 may include an O-RU (O-RAN radio unit) 21 communicatively connected to the BS 10, and FEUs 231 to 236 communicatively connected to the UE 30.

The O-RU 21 may be communicatively connected to the BS 10 to relay signals between the UE 30 connected to the O-RU 21 and the BS 10 during communication.

In this case, the O-RU 21 may be connected to the BS 10, specifically, a distributed unit (DU) 12 by a wire (e.g., an optical cable) rather than in a wireless manner.

In the 5G wireless access network, the BS 10 includes a central unit (CU) 11 and the DU 12, which are divided due to an increase in radio transfer rate and an increase in fronthaul capacity according to the MIMO system, and is allowed to have an open BS structure having a variety of structures so as to selectively apply eight functionally separated options to the CU 11 and the DU 12 (see FIG. 5).

In the open-radio access network (O-RAN), the physical layer is functionally separated, and the DU 12 is in charge of the high PHY of option7, and the O-RU 21 is in charge of the low PHY of option8. Also, the O-RU 21 and the DU 12 may be connected to each other via a fronthaul interface.

That is, the O-RU 21 according to an embodiment of the present disclosure may support the BS 10, specifically, the DU 12 and the fronthaul interface.

In general, the O-RU 21 has a function of radio frequency (RF) communication, and may relay a communication connection between the UE 30 and the BS 10 wirelessly connected to each other. However, when the O-RU 21 according to the embodiment of the present disclosure is implemented for in-building use, the O-RU 21 may not have the RF communication function, but the FEUs 231 to 236 may have the the RF communication function and be communicatively connected to the UE 30 in a wireless manner.

That is, the O-RU 21 according to the embodiment of the present disclosure uses the FEUs 231 to 236 having the RF communication function to indirectly relay a communication signal between the BS 10 and the UE 30.

In addition, when necessary, the in-building O-RU 21 may further include extension units (EU) 221 to 223 for bidirectional transmission of signals between one O-RU 21 and a plurality of FEUs 231 to 236 as a concentrator, that is, a hub.

For example, as shown in FIG. 5, an O-RU 21 connected to the BS 10 by wire may be installed in a building. In addition, a plurality of FEUs 231 to 236 connected to the UE 30, and an EU 221 for distributing a communication signal between the O-RU 21 and the plurality of FEUs 231 to 236 may be provided. In this case, the FEUs 231 to 236 may be provided for each floor when installed in a building. However, embodiments are not limited thereto.

Here, the FEUs 231 to 236 according to the embodiment of the present disclosure may have an antenna for transmitting and receiving wireless signals to and from the UE 30. As described above, the FEUs 231 to 236 may perform RF communication with the UE 30 using the antenna. That is, the UE 30 may be communicatively connected to the BS 10 by the relay of the in-building O-RU 21 including the FEUs 231 to 236 having the RF communication function.

However, as described above, the O-RU 21 according to the embodiment of the present disclosure distributed the communication paths between the BS 10 and the plurality of FEUs 231 to 236 using the beamforming information (see FIG. 4B).

That is, the O-RU 21 according to the embodiment of the present disclosure may match the beam ID with the FEUs 231 to 236 based on the beamforming information received from the BS 10.

When the O-RU 21 is for in-building use, the O-RU 21 does not need to perform beamforming. However, the O-RU 21 according to the embodiment of the present disclosure may match the beam ID with the FEUs 231 to 236 based on the SSB information extracted by pre-coding the beamforming information transmitted from the BS, specifically, the DU 12.

Specifically, the O-RU 21 may match the EUs 221 to 223 based on the SSB index obtained from the SSB information, and match the FEUs 231 to 236 based on a CSI-RS index, which is for refined beamforming.

Here, the CSI-RS index belongs to the SSB index acquired from the extracted SSB information. Among terms used herein, the beam ID may be a combination of the SSB index and the CSI-RS index belonging thereto.

For example, as shown in FIG. 4B, an O-RU having a conventional an RF communication function may perform beamforming using a total of 8 SSB indexes (SSB0 to SSB7) and a total of 16 CSI-RS indexes (CSI-RS0 to CSI-RS15)) for each beam.

The O-RU 21 according to the embodiment of the present disclosure does not have the RF communication function. However, the SSB index extracted by pre-coding the beamforming information transmitted from the BS 10 is SSB3 and the CSI-RS index thereof is CSI-RS0, the O-RU 21 match the beam ID with the FEU assigned reference numeral 233. Similarly, when the SSB index extracted from the beamforming information transmitted from the BS 10 is SSB3 and the CSI-RS index is CSI-RS1, the O-RU 21 may match the beam ID with the FEU assigned reference numeral 234.

Here, since the SSB index acquired by the O-RU 21 from the beamforming information is SSB3, the FEU 223 corresponding to SSB3 among the EUs 221 to 222 may be matched with the SSB index. The FEU 233 and the FEU 224 may be communicatively connected to the FEU 223 according to the same SBS index.

That is, the O-RU 21 according to the embodiment of the present disclosure may match the FEUs 231 to 236 to CSI-RS indexes in a one-to-one correspondence manner, and match the EUs 221 to 223 to SSB indexes in a one-to-one correspondence manner.

When the O-RU 21 according to the embodiment of the present disclosure matches the beam ID and the FEUs 231 to 236, it may allow only communication signals relayed by the matched FEUs 231 to 236 to be transmitted and received to and from the BS 10.

Accordingly, communication signals from the unmatched FEUs 231 to 236 not matched by the O-RU 21 may not be relayed by the O-RU 21. Accordingly, the uplink noise transmitted from the unmatched FEUs 231 to 236 may be blocked from being transmitted to the BS 10.

FEUs 231 to 236 which are not in their own time-division sections, or FEUs 231 to 236 that are not matched due to absence of the connected UE 30 may be deactivated. In this case, the communication path between the unmatched FEUs 231 to 236 and the O-RU 21 may be switched off. Accordingly, even if the signals transmitted from multiple FEUs 231 to 236 are aggregated and transmitted to the BS 10, the noise from the unmatched FEUs 231 to 236 does not overlap the uplink signal transmitted from the matched FEUs 231 to 236. Therefore, even when the number of FEUs 231 to 236 connected to the O-RU 21 is increased, the noise factor (NF) of the signal transmitted to the BS 10 via the O-RU 21 may not increase.

The O-RU 21 according to a preferred embodiment of the present disclosure may perform precoding on the beamforming information transmitted from the BS 10 according to a predetermined period.

In general, when beam-sweeping or beam-scanning is performed in a plurality of beam directions, SSB information is transmitted by being temporally divided according to a predetermined period. Accordingly, the O-RU 21 according to an embodiment of the present disclosure may perform precoding according to the predetermined period. Here, the period may be a generation period of C-plane data, an OFDM symbol unit, or the like, and may be, for example, about 1 ms.

Also, here, the O-RU 21 according to a preferred embodiment of the present disclosure may pre-code only C-plane data of the fronthaul interface.

As described above, the DU 12 of the BS 10 may be connected to the O-RU 21 through a fronthaul interface. In this case, the O-RU 21 may pre-code only a C-plane data corresponding to a protocol for control signal transmission among the C-plane data and the U-plane data corresponding to a protocol for user data transmission, and the S-plane data corresponding to a protocol for synchronization, thereby improving processing speed and processing efficiency.

That is, preferably, the O-RU 21 may extract beam ID information and the like by precoding only the C-plane data.

Control Method for In-Building O-RU

FIG. 7 is a step-by-step flowchart of a method for controlling a relay according to an embodiment of the present disclosure.

As shown in FIG. 7, the method for controlling an in-building O-RU according to an embodiment of the present disclosure may include an operation S10 of matching a beam ID with the FEUs 231 to 236 based on beamforming information received from the BS 10 by the in-building O-RU 21 of the system, and an operation S20 of communicatively connecting the UE 30 to the BS 10 via the matched FEUs 231 to 236.

Specifically, the matching operation S10 may include acquiring an SSB index and a CSI-RS index from SSB information extracted by pre-coding the beamforming information by the O-RU 21, sequentially matching extension units 221 to 222 by the O-RU 21 based on the SSB index, and matching the FEUs 231 to 236 connected to the extension units 221 to 222 based on the CSI-RS index.

Since each operation has been described above, the description thereof will be omitted.

The operations illustrated in FIG. 7 or the operations according to an embodiment of the present disclosure described above are not essential. The method for controlling the in-building O-RU may be implemented to have more operations or fewer operations.

While present disclosure has been particularly shown and described with reference to exemplary embodiments thereof, it will be understood by those skilled in the art that various changes in form and details may be made herein without departing from the spirit and scope of the present disclosure as defined by the appended claims.

Accordingly, the scope of the present disclosure is to be defined by the claims below rather than the detailed description, and all changes or modifications derived from the meaning, scope, and equivalent concept of the claims are included in the scope of the present disclosure.

The invention claimed is:

1. An in-building radio unit applied to an open LAN having an open base station structure, the in-building radio unit being configured to:
   match a beam ID and a front-end unit based on beamforming information received from a base station; and
   communicatively connect a terminal and the base station via the matched front-end unit, the terminal and the base station being connected to the matched front-end unit, wherein the in-building radio unit supports a fronthaul interface with the base station, the front-end unit being positioned between the in-building radio unit and the terminal to relay a communication signal;

wherein an extension unit configured to transmit a signal is further provided between the radio unit and the front-end unit; and wherein the in-building radio unit matches the extension unit and the front-end unit based on an SSB index and a CSI-RS index acquired from SSB information extracted by pre-coding the beamforming information.

2. The in-building radio unit of claim 1, wherein the terminal is wirelessly communicatively connected to the front-end unit rather than the radio unit.

3. The in-building radio unit of claim 2, wherein the in-building radio unit is for in-building use and is communicatively connected to the base station by wire, wherein the in-building radio unit distributes communication paths between the base station and the front-end unit based on the beamforming information.

4. The in-building radio unit of claim 1, wherein the in-building radio unit skips transmission of an unmatched signal of the front-end unit except for a matched signal of the front-end unit according to the beamforming information.

5. The in-building radio unit of claim 1, wherein the beamforming information is configured according to a generation period of C-plane data of the fronthaul interface.

6. The in-building radio unit of claim 5, wherein the in-building radio unit pre-codes only the C-plane data of the fronthaul interface.

7. A system comprising:
the in-building radio unit according to claim 1; and
a base station and a terminal communicatively connected via the in-building radio unit.

8. A method for controlling an in-building radio unit applied to an open LAN having an open base station structure, the method comprising:
matching, by the in-building radio unit, a beam ID and a front-end unit based on beamforming information received from a base station; and
communicatively connecting a terminal and the base station via the matched front-end unit, the terminal and the base station being connected to the matched front-end unit, wherein the in-building radio unit supports a fronthaul interface with the base station, the front-end unit being positioned between the in-building radio unit and the terminal to relay a communication signal, wherein an extension unit is positioned between the in-building radio unit and the front-end unit to transmit the signal, wherein the matching comprises:
acquiring, by the in-building radio unit, an SSB index and a CSI-RS index from SSB information extracted by pre-coding the beamforming information;
matching, by the in-building radio unit, the extension unit based on the SSB index; and
matching, by the in-building radio unit, the front-end unit connected to the extension unit based on the CSI-RS index.

9. A system comprising:
the in-building radio unit according to claim 2; and
a base station and a terminal communicatively connected via the in-building radio unit.

10. A system comprising:
the in-building radio unit according to claim 3; and
a base station and a terminal communicatively connected via the in-building radio unit.

11. A system comprising:
the in-building radio unit according to claim 4; and
a base station and a terminal communicatively connected via the in-building radio unit.

12. A system comprising:
the in-building radio unit according to claim 5; and
a base station and a terminal communicatively connected via the in-building radio unit.

13. A system comprising:
the in-building radio unit according to claim 6; and
a base station and a terminal communicatively connected via the in-building radio unit.

* * * * *